(12) United States Patent
Fattal et al.

(10) Patent No.: US 7,593,606 B2
(45) Date of Patent: Sep. 22, 2009

(54) OPTICAL MODULATOR INCLUDING WAVEGUIDE GRATING STRUCTURE AND MULTIPLE QUANTUM WELL LAYER

(75) Inventors: David Fattal, Mountain View, CA (US); Michael M. Sigalas, Mountain View, CA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 6 days.

(21) Appl. No.: 11/888,032

(22) Filed: Jul. 30, 2007

(65) Prior Publication Data

US 2009/0034899 A1  Feb. 5, 2009

(51) Int. Cl.
*G02F 1/035* (2006.01)
(52) U.S. Cl. .............................. 385/2; 372/102; 385/27; 385/37
(58) Field of Classification Search ..................... 385/2, 385/27, 37, 129; 372/102
See application file for complete search history.

(56) References Cited

U.S. PATENT DOCUMENTS

| | | | | |
|---|---|---|---|---|
| 5,337,183 | A * | 8/1994 | Rosenblatt | 359/248 |
| 5,485,014 | A * | 1/1996 | Jain et al. | 257/21 |
| 5,625,729 | A | 4/1997 | Brown | |
| 5,781,670 | A | 7/1998 | Deacon et al. | |
| 6,035,089 | A | 3/2000 | Grann et al. | |
| 6,154,480 | A * | 11/2000 | Magnusson et al. | 372/96 |
| 6,829,067 | B2 | 12/2004 | Psaltis et al. | |
| 6,836,501 | B2 * | 12/2004 | Cox et al. | 372/108 |
| 6,999,156 | B2 | 2/2006 | Chou et al. | |
| 7,009,680 | B2 | 3/2006 | Cavanaugh et al. | |
| 7,013,064 | B2 | 3/2006 | Wang | |
| 7,167,615 | B1 | 1/2007 | Wawro et al. | |
| 7,212,712 | B2 | 5/2007 | Ramadan | |
| 7,264,973 | B2 * | 9/2007 | Lin et al. | 436/518 |
| 2002/0141063 | A1 | 10/2002 | Petrov et al. | |
| 2004/0120644 | A1 | 6/2004 | Chou et al. | |
| 2006/0024013 | A1 * | 2/2006 | Magnusson et al. | 385/129 |
| 2007/0071061 | A1 | 3/2007 | Pietra et al. | |

OTHER PUBLICATIONS

Katchalski, Tsvi, et. al., "Light Modulation with Electro-optic Polymer-Based Resonant Grating Waveguide Structures," Optics Express, vol. 13, No. 12, 2005, pp. 4645-4650.
Kuo, Yu-Hsuan, et. al., "Strong Quantum-Confined Start Effect in Germanium Quantum-Well Structures on Silicon," Nature, vol. 437, No. 27, 2005, pp. 1334-1336.
Tan, Hua, et. al., "A Tunable Subwavelength Resonant Grating Optical Filter," Lasers and Electro-Optics Society, LEOS 2002, 15th Annual Mtg. IEEE, Nov. 2002, vol. 2, pp. 825-826.

(Continued)

*Primary Examiner*—Ellen Kim (57) ABSTRACT

An optical modulator and related methods are described. In accordance with one embodiment, the optical modulator comprises a horizontal waveguide grating structure (WGS) receiving an incident radiation beam propagating in a non-horizontal direction. The WGS includes a horizontal waveguiding layer along which a lateral propagation mode is guided, the lateral propagation mode having a vertically extending mode profile. The optical modulator further comprises a multiple quantum well (MQW) layer sufficiently proximal to the horizontal waveguiding layer to be within a vertical extent of the mode profile of the lateral propagation mode. The optical modulator further comprises an electric field source applying a time-varying electric field to the MQW layer. The optical modulator modulates the incident radiation beam according to the time-varying electric field to generate a modulated radiation beam propagating in one of a transmitted direction and a reflected direction.

20 Claims, 4 Drawing Sheets

OTHER PUBLICATIONS

Rabady, Rabi, et. al., "Fabrication Methods of Optical Resonant Filters with a Close-to-Rectangle Filtering Profile," Applied Optics, vol. 43, No. 5, Feb. 2004, pp. 1114-1120.

Thurman, Samuel, et. al., "Controlling the Spectral Response in Guided-Mode Resonance Filter Design," Applied Optics, vol. 42, No. 16, Jun. 2003, pp. 3225-3233.

* cited by examiner

OPTICAL MODULATOR INCLUDING WAVEGUIDE GRATING STRUCTURE AND MULTIPLE QUANTUM WELL LAYER

FIELD

This patent specification relates to controlling the propagation of electromagnetic radiation and, more particularly, to optical modulation.

BACKGROUND

Devices for altering the propagation of electromagnetic radiation, such as by modulation, represent fundamental building blocks for many technological endeavors. Modulation refers generally to the timewise variation of a property of an electromagnetic wave or signal, such as amplitude, frequency, phase, etc., according to a time varying control signal or modulation signal. Optical modulation refers to the modulation of electromagnetic radiation at optical frequencies, which can include infrared, visible, and ultraviolet frequencies. Electrooptical modulation refers to optical modulation according to an electrical modulation signal.

Practical issues often arise in the implementation of electrooptic modulators in regard to one or more of modulation speed, extinction ratio, drive voltage requirements, drive current requirements, spectral range of operation, noise performance, heat dissipation, device cost, device power consumption, and device size. Other issues arise as would be apparent to one skilled in the art in view of the present disclosure.

SUMMARY

In one embodiment, an optical modulator is provided, comprising a horizontal waveguide grating structure (WGS) receiving an incident radiation beam propagating in a non-horizontal direction. The WGS includes a horizontal waveguiding layer along which a lateral propagation mode is guided, the lateral propagation mode having a vertically extending mode profile. The optical modulator further comprises a multiple quantum well (MQW) layer sufficiently proximal to the horizontal waveguiding layer to be within a vertical extent of the mode profile of the lateral propagation mode. The optical modulator further comprises an electric field source applying a time-varying electric field to the MQW layer. The optical modulator modulates the incident radiation beam according to the time-varying electric field to generate a modulated radiation beam propagating in one of a transmitted direction and a reflected direction.

Also provided is a method of optical modulation, comprising causing an incident radiation beam to impinge upon a modulating structure from a non-horizontal direction, the modulating structure comprising a horizontal waveguide grating structure (WGS) and a nearby multiple quantum well (MQW) layer. The WGS includes a horizontal waveguiding layer along which a lateral propagation mode having a vertically extending mode profile is guided. The MQW layer is sufficiently proximal to the horizontal waveguiding layer to be within a vertical extent of the mode profile. The method further comprises applying a time-varying electric field to the MQW layer according to a modulation signal to generate a modulated radiation beam propagating in one of a transmitted direction and a reflected direction.

Also provided is an optical apparatus, comprising an optical source providing an incident radiation beam propagating in a non-horizontal direction, and a horizontally disposed modulating structure receiving a modulation signal and receiving the incident radiation beam. The modulating structure modulates the incident radiation beam according to the modulation signal to produce a modulated radiation beam. The modulating structure comprises a horizontal waveguide grating structure (WGS) including a horizontal waveguiding layer along which a lateral propagation mode is guided, the lateral propagation mode having a vertically extending mode profile. The modulating structure further comprises a multiple quantum well (MQW) layer sufficiently proximal to the horizontal waveguiding layer to be within a vertical extent of the mode profile of the lateral propagation mode. The modulating structure further comprises an electric field source applying a time-varying electric field to the MQW layer according to the modulation signal.

DETAILED DESCRIPTION

Figure 1:
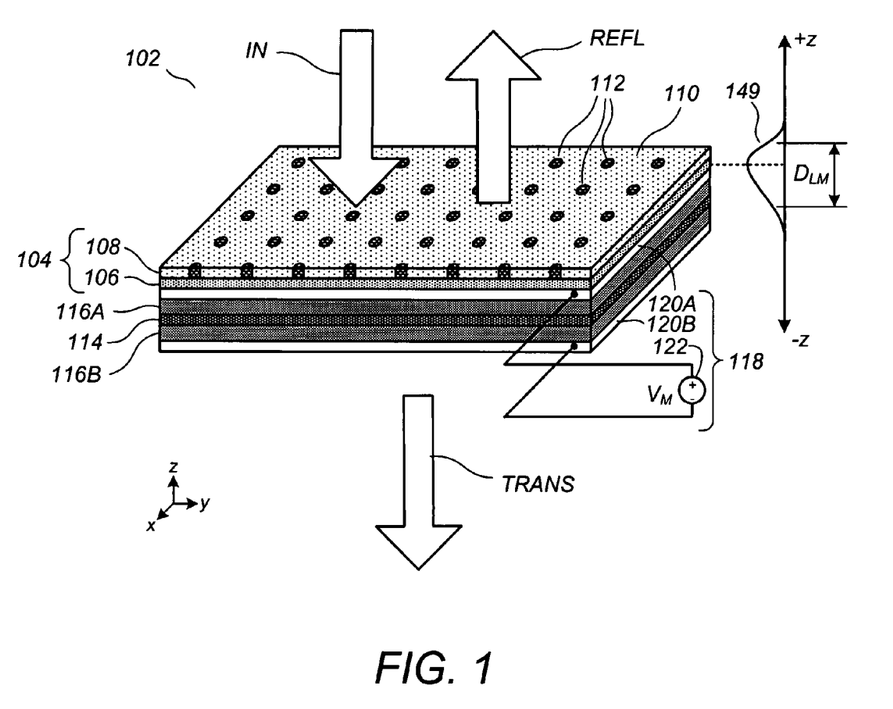
FIG. 1 illustrates a perspective view of an optical modulator according to an embodiment.

FIG. 1 illustrates a perspective view of an optical modulator 102 according to an embodiment. Optical modulator 102 comprises a horizontally oriented waveguide grating structure (WGS) 104 comprising a waveguiding layer 106 and a subwavelength periodic grating layer 108 having a periodic pattern of defects 112. Optical modulator 102 further comprises a multiple quantum well (MQW) layer 114 proximal to the WGS 104 and sandwiched between a first insulating layer 116A and a second insulating layer 116B. In turn, the MQW layer 114, the first insulating layer 116A, and the second insulating layer 116B are sandwiched between a first electrode layer 120A and a second electrode layer 120B. A voltage source 122 is coupled across the first electrode layer 120A and the second electrode layer 120B to apply a modulation voltage $V_M$ thereacross.

Incident radiation (IN) propagates in a non-horizontal direction (for example, vertically downward or at an off-vertical angle downward) toward the optical modulator 102. Depending on the radiation frequency and other aspects of the optical modulator 102 as described further hereinbelow, the incident radiation (IN) can be reflected upward to result in reflected radiation (REFL) and/or can continue propagating downward to result in transmitted radiation (TRANS). It is to be appreciated that the terms horizontal and vertical, and related terms such as upward and downward, are used herein to provide a readily understandable reference frame for clear description of the embodiments, and are not intended to convey an absolute orientation relative to gravity or other external frames of reference.

Upon modulation of one or more properties of the optical modulator 102, a modulated radiation beam is produced in the form of one of the reflected radiation REFL (in a reflective modulation mode) and the transmitted radiation TRANS (in a transmissive modulation mode). It is to be appreciated that the reflected direction of propagation of the reflected radiation REFL, which is generally upward in a non-horizontal direction, may be the same as or different than a mirrored angle of attack of the incident radiation beam IN, depending on material coefficients surrounding the optical modulator 102 and/or other factors. Likewise, the transmitted direction of propagation of the transmitted radiation TRANS, which is generally downward in a non-horizontal direction, may correspond or not correspond to the angle of attack of the incident radiation beam IN, depending on material coefficients surrounding the optical modulator 102 and/or other factors.

The voltage source 122, the first electrode layer 120A, and the second electrode layer 120B form an electric field source 118 that causes an electric field to be applied across the MQW layer 114, the first insulating layer 116A, and the second insulating layer 116B, the electric field varying according to the modulation voltage $V_M$. Each of the first and second insulating layers 116A and 116B should comprise a nonconducting material and/or a dielectric with a high enough bandgap such that current flow therethrough is inhibited for all expected voltage levels thereacross. It is to be appreciated that FIG. 1 illustrates, for purposes of clarity, more layers than may actually be necessary to implement an optical modulator according to the present teachings. In other embodiments, the functionalities of different layers or substructures can be combined or integrated into a fewer number of layers or substructures, as in the example of FIG. 4, infra.

In accordance with a functionality of the WGS 104 as a guided mode resonance (GMR) filter, alternatively referenced as a subwavelength resonant grating (SRG) filter, the WGS 104 including the waveguiding layer 106 provides guidance for a laterally propagating mode having a vertically extending mode profile 149. The mode profile 149 has a vertical extent $D_{LM}$ that can be defined, for example, by a full width at half maximum (FWHM) width in the z-direction. According to an embodiment, the MQW layer 114 is sufficiently proximal to the horizontal waveguiding layer 106 to lie within the vertical extent $D_{LM}$ of the mode profile 149 of the laterally propagating mode. Particular behaviors of the MQW layer 114 that occur responsive to the application of a time-varying electric field thereacross, which are described further infra, can thereby be used to achieve modulation of the incident radiation beam IN by virtue of the effect of those particular behaviors on the operation of the WGS 104.

As used herein, defect refers to a localized variation in a radiation-affecting property of a material layer, such as its refractive index, which can be brought about in any of a variety of known ways including localized insertions of different materials into the layer, localized removal of material from a layer, and localized processing that changes material properties. A grating is formed by a spatial pattern of defects in a layer. In the example of FIG. 1, the subwavelength periodic grating layer 108 comprises a bulk material 110 into which is inserted a two-dimensional pattern of island-like defects 112. In other embodiments, the defects can be linear to form a one-dimensional grating pattern.

In accordance with the GMR/SRG functionality of the WGS 104, a refractive index of the waveguiding layer 106 should be greater than the refractive indices of the various surrounding layers. More generally, however, it is required only that there exists some form of higher-index layer (or group of higher-index layers) sandwiched between some form of lower-index layers (or groupings of lower-indexed layers, which can include air) such that guidance of a lateral propagation mode is facilitated. Stated another way, the nonexistence of the particular condition that the waveguiding layer 106 be of greater refractive index than the various surrounding layers does not necessarily defeat the existence or functionality of the optical modulator 102 according to the embodiments, but rather just results on a nomenclature change in which some other layer (or group of layers) is instead referenced as the waveguiding layer and/or WGS of the optical modulator 102.

Returning to the particular example of FIG. 1, the subwavelength periodic grating layer 108 should be separated from the waveguiding layer 106 by less than the vertical extent $D_{LM}$ of the mode profile 149 corresponding to the lateral radiation mode guided along the waveguiding layer 106. The grating structure embodied in the subwavelength periodic grating layer 108 can comprise any of a variety of periodic patterns known to facilitate GMR filter functionality, with such periodic patterns usually having a spatial period in at least one dimension that is less than the wavelength of the incident radiation IN. When so patterned, as a result of a coupling process between the incident radiation IN and the lateral radiation mode(s) guided along the waveguiding layer 106, the zero-order diffracted plane wave is reflected upward for a narrow band of frequencies around a peak reflection frequency. The particular value of the peak reflection frequency, the width of the reflection band, and other spectral characteristics are dependent upon the various layer thicknesses and refractive indices, along with the grating pattern and the defect materials used. The value of the peak reflection frequency can also vary with the sine of the angle at which the incident radiation impinges upon the WGS 104.

When the MQW layer 114 is separated from the horizontal waveguiding layer 106 by less than the vertical extent $D_{LM}$ of the mode profile 149 according to an embodiment, the MQW layer 114 is sufficiently proximal to the WGS 106 such that a refractive index variation in the MQW layer 114 causes a shift in the peak reflection frequency. For one embodiment, when a time-varying external electric field is induced across the MQW layer 114 by the electric field source 118, the refractive index is correspondingly varied by virtue of a quantum confined Stark effect (QCSE) and a Kramers-Kronig relation, as described further below. As used herein, external electric field refers to an electric field associated with something other than that of the propagating radiation itself. By virtue of the proximity of the MQW layer to the WGS 106, the refractive index variations in the MQW layer 114 cause corresponding shifts in the peak reflection frequency which, in turn, results in a corresponding modulation of the incident radiation beam IN.

According to an embodiment, the particular mechanism by which the refractive index of the MQW layer 114 is varied by an amount sufficient to induce shifts in the peak reflective frequency is based on the QCSE. Generally stated, the QCSE is related to excitonic absorption. An exciton is a quasiparticle of a solid material corresponding to a bound state of an electron with a hole. Whereas excitons can survive only at very low temperatures in bulk semiconductor materials, excitons in MQW structures can survive even at room temperatures. Excitons have maximum absorption near band edges. The amount of excitonic absorption in a MQW structure can be controlled by applying an external electric field. The application of the electric field results in a change of energy levels at the lower sub-bands existing in the conduction and valence bands. By using a Kramers-Kronig relation, it can be shown that any change in the absorption, which is a function of the imaginary part of the refractive index, results in a change of the real part of the refractive index. Hence, control of the external electric field applied across the MQW layer 114 can control the amount of excitonic absorption therein which, in turn, can control the refractive index exhibited by the MQW layer 114.

In accordance with another embodiment, which can be implemented independently or in conjunction with the above-described modulation mechanism as dictated by parameters of the MQW chosen empirically, analytically, and/or by computer simulation, the modulation can be carried out more directly by virtue of changes the amount of absorbed light in the MQW layer 114. More particularly, modulation can be achieved by entering into, and departing from, a substantially dissipative critical coupling state between the incident radiation beam, the WGS, and the MQW layer due to variations in the absorptance coefficient of the MQW layer, which varies according to the time-varying electric field. In an OFF state, the absorption coefficient of the quantum well can be set (with the appropriate electric field) so that the incident radiation beam is critically coupled to the GMR resonance. Critical coupling occurs when the coupling rate of the incident radiation power to the lateral propagation mode(s) via the GMR gratings equals the power dissipation rate, via grating scattering and absorption, of the lateral propagation mode itself. In these conditions, substantially all the incident optical energy will be dissipated, i.e., absorbed and scattered, by the WGS 104/MQW layer 114 and no coherent reflection or transmission will occur. In an ON state, the value of the absorption coefficient of the MQW layer 114 is changed to a smaller or greater value, so that not all the incident power is dissipated, and therefore some power will be transmitted and/or reflected.

Advantageously, optical modulation according to one or more of the embodiments can be achieved with a low driving voltage (e.g. on the order of 1V) because only modest variations in the electrical field are required to vary the refractive index by an amount sufficient to shift the peak reflective frequency. Also, the refractive index and absorption changes associated with the QCSE/Kramers-Kronig relation are very fast, allowing for very high modulation rates that can approach 100 GHz. Drive current requirements can also be modest. Indeed, the drive current is zero at a steady-state ON or OFF state of the electric field, the optical modulator 102 requiring zero power for either of these states. Moreover, because the reflection of the incident radiation beam is based primarily on resonance, a high extinction ratio (ratio of maximum to minimum modulated optical power) is provided, and indeed can be enhanced even further by MQW absorption effects according to one or more embodiments described infra.

Materials that may be suitable for the waveguiding layer 106 include, but are not limited to, relatively high-index materials such as Si ($\eta$=3.42), InP ($\eta$=3.1), GaAs ($\eta$=3.3), and SiN/Si$_3$N ($\eta$=2.2). Other examples include, but are not limited to, Group IV materials (e.g., Si, Ge, SiC), Group III-V materials (e.g., GaN, GaP, InP, InAs, AlN), and Group II-VI materials (e.g., ZnO, CdS). It is, of course, desirable for the various layers of the optical modulator to be at least somewhat transparent for the optical frequencies of interest, although the scope of the present teachings is not so limited. Among other examples, materials that may be suitable for the bulk material 110 of the subwavelength periodic grating layer 108 (as well as the first/second insulating layers 116A/116B) include, but are not limited to, SiO ($\eta$=1.44), poly-dimethyl siloxane (PDMS, $\eta$=1.4), polymethyl methacrylate (PMMA, $\eta$=1.49), quartz glass ($\eta$=1.44), oxide dielectrics, and undoped semiconductor materials. Among other examples, the MQW layer 114 may comprise multiple quantum wells according to one of an InGaAsP/InGaAs/InP MQW material system and a Ge/SiGe MQW material system. Among other examples, materials that may be suitable for the first/second electrode layers 120A/120B include, but are not limited to, indium tin oxide (ITO) and oppositely-doped semiconductor materials.

Figure 2:
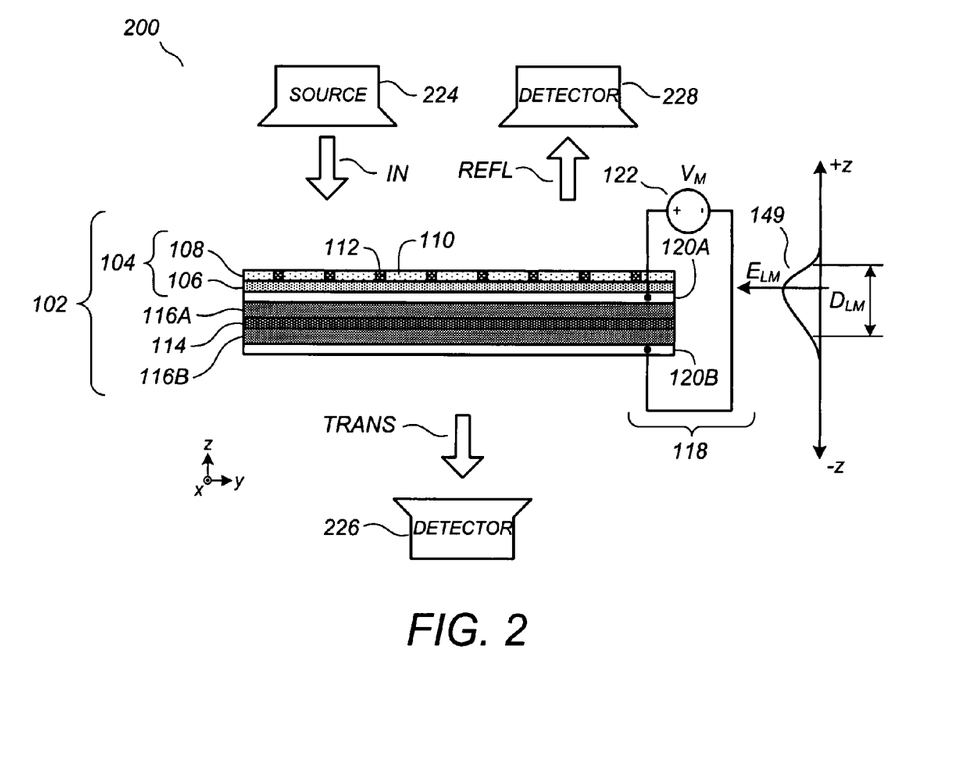
FIG. 2 illustrates a side view of an optical modulator according to an embodiment.

FIG. 2 illustrates a side view of an optical modulator system 200 according to an embodiment, which includes the optical modulator 102 of FIG. 1 together with additional components including an optical source 224 for providing the incident radiation IN, a first optical detector 226 for receiving the transmitted radiation TRANS, and a second optical detector 228 for receiving the reflected radiation REFL. Although the incident, transmitted, and reflected beams are illustrated as being strictly vertical in the example of FIG. 2 and other examples herein, it is to be appreciated that they may be at various different non-horizontal angles without departing from the scope of the embodiments.

Figure 3:
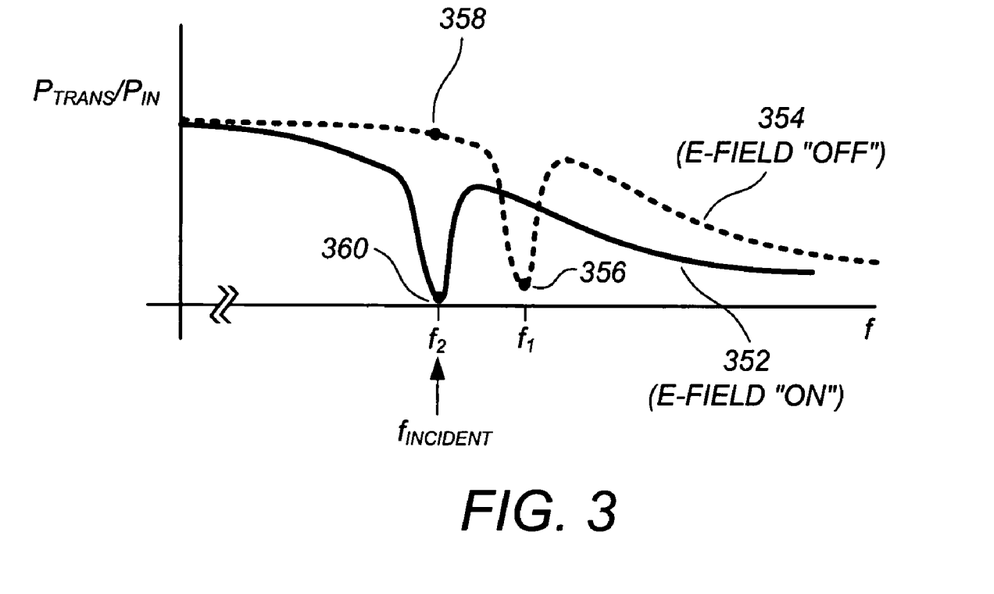
FIG. 3 illustrates spectral plots of a ratio of transmitted radiation power to incident radiation power corresponding to the optical modulator of FIG. 2.

FIG. 3 illustrates spectral plots of a ratio of transmitted radiation power $P_{TRANS}$ to incident radiation power $P_{IN}$ for to the optical modulator system 200 of FIG. 2. According to an embodiment, where the primary modulation mechanism is peak frequency shifting according to refractive index variations in the MQW layer 114, supra, extinction ratio performance is enhanced for a transmissive mode of the optical modulator system 200. By transmissive mode, it is meant that the modulated radiation beam is the TRANS signal as measured by the first detector 226. More particularly, the extinction ratio for the transmissive mode is particularly high where (a) the peak reflection frequency shifts between a first frequency $f_1$ corresponding to an OFF state of the electric field (see FIG. 3, curve 354) and a second frequency $f_2$ corresponding to an ON state of the electric field (see FIG. 3, curve 352), (b) the optical absorption in the MQW layer is higher for the ON state of said electric field than the OFF state of said electric field (which is readily achieved by defining the OFF state as a zero-field state), and (c) the incident radiation beam is substantially at the second frequency $f_2$. For this mode of operation, the modulated output TRANS is high (ON) when the electrical field is zero (OFF) (see FIG. 3, point 358), and the modulated output TRANS is low (OFF) when the electrical field is high (ON) (see FIG. 3, point 360). For this mode of operation, the QCSE-induced absorption in the MQW layer 114 operates synergistically with the WGS 104 to increase the extinction ratio (i.e., the ratio of the optical power for point 358 divided by the optical power for the point 360) by working in harmony to drive the output power closer to zero when the electric field is high (ON). This can be contrasted, for example, with applying the incident radiation beam at the first frequency f1, in which case the low (OFF) state of the modulated signal TRANS is not enhanced by absorption in the MQW layer 114 (see FIG. 3, point 356). Advantageously, the absorptance in the MQW layer 114 is further increased by virtue of resonant field effects within the optical modulator 102 in its non-transmissive state. Namely at the GMR resonant frequency, the secondary waves resulting from the scattering of the incident light wave on the grating defects interfere constructively to give a very intense field in the dielectric waveguide, increasing the absorbed optical power in the quantum Well as a result.

Generally speaking, extinction ratio issues for a reflective mode of the optical modulator system 200 are not as pronounced compared to the transmissive mode. By reflective mode, it is meant that the modulated output signal is the REFL signal as measured by the second detector 228. This is largely because the reflectivity will be near zero anyway at frequencies sufficiently away from the resonance peak. Rather, the main challenge for reflective mode operation will instead be directed toward maximizing the amount of reflectance incurred for a logical high (ON) of the REFL signal, where absorption issues within the device are of lesser significance on a percentage basis with regard to the extinction ratio. However, for many practical applications it will be desirable for the optical modulator system 200 to operate in transmissive mode rather than reflective mode, and in such cases there is indeed provided a useful synergy between MQW layer absorptance and the transmission-inhibiting resonances in the device.

Figure 4:
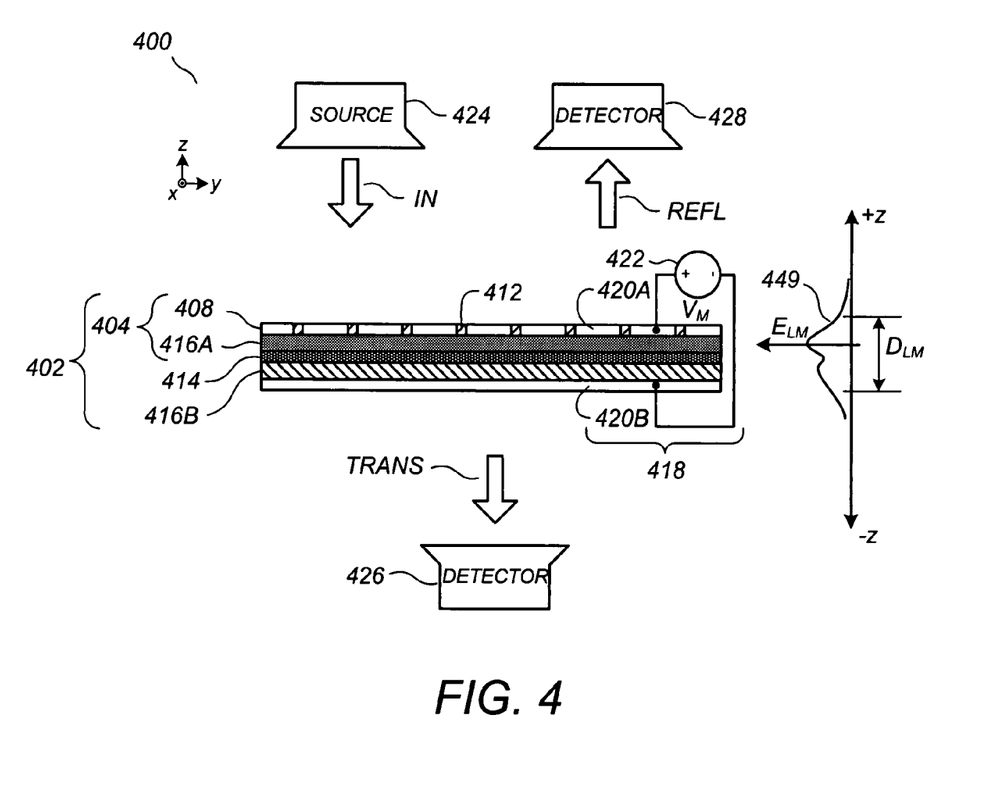
FIG. 4 illustrates a side view of an optical modulator according to an embodiment.

FIG. 4 illustrates an optical modulation system 400 according to an embodiment, representing one example of many different configurations and/or integrations of the various device layers that can be implemented without departing from the scope of the present teachings. Optical modulation system 400 comprises a optical source 424 for providing an incident radiation beam IN impinging non-horizontally upon an optical modulator 402, a first optical detector 426 for receiving radiation TRANS transmitted through the optical modulator 402, and a second optical detector 428 for receiving radiation REFL reflected from the optical modulator 402. Here, the optical modulator 402 comprises a MQW layer 414 sandwiched between a first insulating layer 416A and a second insulating layer 416B, which are in turn sandwiched by a first electrode 420A and a second electrode 420B. An electric field source 418 is formed by a voltage source 422 coupled across the first/second electrode layers 420A/420B and applying a modulation voltage $V_M$ thereacross.

Optical modulator 402 further comprises a waveguide grating structure (WGS) 404 that provides guidance for a laterally propagating mode with a mode profile 449 having a vertical extent of $D_{LM}$ defined, for example by a FWHM width (in the z-direction). The first insulating layer 416A comprises a highest-index material as compared to surrounding layers, such that it also serves as a waveguiding layer for the WGS 404. The first electrode 420A is patterned with defects 412 such that it also serves as a subwavelength periodic defect layer 408 for the WGS 404. Many other configurations and/or integrations of the various device layers can be used to form the optical modulator 402 without departing from the scope of the present teachings. For example, configurations of the various layers for achieving the desired WGS functionality can correspond to one or more of the teachings of U.S. Ser. No. 11,879,242 filed Jul. 16, 2007, which is incorporated by reference herein.

Fabrication of optical devices according to one or more of the embodiments can be achieved using known fabrication methods including, but not limited to: deposition methods such as chemical vapor deposition (CVD), metal-organic CVD (MOCVD), plasma enhanced CVD (PECVD), chemical solution deposition (CSD), sol-gel based CSD, metal-organic decomposition (MOD), Langmuir-Blodgett (LB) techniques, thermal evaporation/molecular beam epitaxy (MBE), sputtering (DC, magnetron, RF), and pulsed laser deposition (PLD); lithographic methods such as optical lithography, extreme ultraviolet (EUV) lithography, x-ray lithography, electron beam lithography, focused ion beam (FIB) lithography, and nanoimprint lithography; removal methods such as wet etching (isotropic, anisotropic), dry etching, reactive ion etching (RIE), ion beam etching (IBE), reactive IBE (RIBE), chemical-assisted IBE (CAIBE), and chemical-mechanical polishing (CMP); modifying methods such as radiative treatment, thermal annealing, ion beam treatment, and mechanical modification; and assembly methods such as wafer bonding, surface mount, and other wiring and bonding methods.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, although described in one or more embodiments supra as being applicable to optical signals, modulators according to one or more of the embodiments can be applied for other frequencies of electromagnetic radiation, such as frequencies within the microwave regime, without departing from the scope of the present teachings. By way of further example, although the electric field applied to the MQW layer would be understood as being relatively uniform thereacross by virtue of uniformly appearing electrode layers, optical modulators according to one or more embodiments can also be highly operative even where the electric field is not uniform, because only modest perturbations of the peak reflection frequency are required for achieving optical modulation. Accordingly, it is to be appreciated that the electrode layers can be patterned into various shapes, resulting in non-uniform electric fields across the MQW layer, without departing from the scope of the present teachings. Thus, reference to the details of the described embodiments is not intended to limit their scope.

What is claimed is:

1. An optical modulator, comprising:
   a horizontal waveguide grating structure (WGS) receiving an incident radiation beam propagating in a non-horizontal direction, the WGS including a horizontal waveguiding layer along which a lateral propagation mode is guided, the lateral propagation mode having a vertically extending mode profile; and
   a multiple quantum well (MQW) layer sufficiently proximal to said horizontal waveguiding layer to be within a vertical extent of said mode profile of said lateral propagation mode; and
   an electric field source applying a time-varying electric field to said MQW layer;
   wherein said optical modulator modulates said incident radiation beam according to said time-varying electric field, to generate a modulated radiation beam propagating in one of a transmitted direction and a reflected direction.

2. The optical modulator of claim 1, wherein said modulation of said incident radiation is achieved by operation of at least one of (A) shifts of a peak reflectance frequency of said WGS caused by variations in a refractive index of said MQW layer according to said time-varying electric field, and (B) entry into and departure from a substantially dissipative critical coupling state between the incident radiation beam, the WGS, and the MQW layer caused by variations in an absorptance coefficient of said MQW layer according to said time-varying electric field.

3. The optical modulator of claim 1, the WGS being configured for peak reflection of said incident radiation beam at a peak reflection frequency, wherein said MQW layer is configured relative to said WGS such that refractive index variations in said MQW layer induced by said time-varying electric field are sufficient to cause corresponding shifts in said peak reflection frequency for modulating said incident radiation beam.

4. The optical modulator of claim 3, said peak reflection frequency shifting between a first frequency corresponding to an OFF state of said time-varying electric field and a second frequency corresponding to an ON state of said time-varying electric field, said refractive index variations being associated with electric field-induced optical absorption variations in said MQW layer according to a quantum confined Stark effect.

5. The optical modulator of claim 4, wherein said modulated radiation beam propagates in said transmitted direction, wherein said optical absorption in said MQW layer is higher for said ON state of said time-varying electric field than for said OFF state of said time-varying electric field, and wherein said incident radiation beam is substantially at said second frequency, whereby the OFF state of said electric field is associated with a non-reflective state of said WGS and a less absorptive state of said MQW layer, and whereby the ON state of said electric field is associated with a reflective state of said WGS and a more absorptive state of said MQW layer.

6. The optical modulator of claim 1, wherein said MQW layer is configured relative to said WGS such that (i) for a first state of the time-varying electric field, said WGS and MQW layer are in a substantially dissipative critical coupling state relative to the incident radiation beam, and (ii) for a second state of the time-varying electric field, said WGS and MQW layer are not in said substantially dissipative critical coupling state relative to the incident radiation beam.

7. The optical modulator of claim 1, wherein said electric field source comprises:
   a first electrode layer positioned above said MQW layer;
   a second electrode layer positioned below said MQW layer; and
   a modulation voltage source coupled to said first and second electrode layers and applying a modulation voltage therebetween.

8. The optical modulator of claim 7, further comprising:
   a first insulating layer positioned between said MQW layer and said first electrode layer; and
   a second insulating layer positioned between said MQW layer and said second electrode layer, said first and second insulating layers inhibiting current flow between said first and second electrode layers through said MQW layer.

9. The optical modulator of claim 8, said WGS further comprising a subwavelength periodic grating layer separated from said horizontal waveguiding layer by less than said vertical extent of said lateral propagation mode profile.

10. The optical modulator of claim 9, wherein at least one of said horizontal waveguiding layer and said subwavelength periodic grating layer is integral with at least one of (a) said first and second at least partially conductive layers and (b) said first and second insulating layers.

11. A method of optical modulation, comprising:
   causing an incident radiation beam to impinge upon a modulating structure from a non-horizontal direction, the modulating structure comprising a horizontal waveguide grating structure (WGS) and a nearby multiple quantum well (MQW) layer, the WGS including a horizontal waveguiding layer along which a lateral propagation mode having a vertically extending mode profile is guided, the MQW layer being sufficiently proximal to the horizontal waveguiding layer to be within a vertical extent of the mode profile; and
   applying a time-varying electric field to the MQW layer according to a modulation signal to generate a modulated radiation beam propagating in one of a transmitted direction and a reflected direction.

12. The method of claim 11, said applying the time-varying electric field causing said modulation of said incident radiation by at least one of (A) shifts of a peak reflectance frequency of said WGS caused by variations in a refractive index of said MQW layer according to said time-varying electric field, and (B) entry into and departure from a substantially dissipative critical coupling state between the incident radiation beam, the WGS, and the MQW layer caused by variations in an absorptance coefficient of said MQW layer according to said time-varying electric field.

13. The method of claim 11, wherein said modulating structure is configured such that no electrical current flows vertically through the MQW layer responsive to the applied electric field.

14. The method of claim 13, wherein said applying the electric field comprises applying a voltage between first and second electrodes according to the modulation signal, the first electrode lying above the MQW layer and separated therefrom by at least a first insulating layer, the second electrode lying below the MQW layer and separated therefrom by at least a second insulating layer.

15. The method of claim 14, the WGS further comprising a subwavelength periodic grating layer separated from the horizontal waveguiding layer by less than said vertical extent of said lateral propagation mode profile.

16. The method of claim 11, the WGS being configured for peak reflection of said incident radiation beam at a peak reflection frequency, wherein said MQW layer is configured relative to said WGS such that refractive index variations in said MQW layer induced by said time-varying electric field are sufficient to cause corresponding shifts in said peak reflection frequency, wherein said applying the time-varying electric field to the MQW layer comprises varying the electric field between an OFF state and an ON state, wherein said peak reflection frequency shifts between a first frequency corresponding to the OFF state of the electric field and a second frequency corresponding to the ON state of the electric field, and wherein said refractive index variations in the MQW layer are associated with electric field induced optical absorption variations therein according to a quantum confined Stark effect.

17. The method of claim 16, wherein said modulated radiation beam propagates in said transmitted direction, wherein an amount of said MQW layer optical absorption is higher for said ON state of the electric field than for said OFF state of the electric field, and wherein the incident radiation beam is substantially at said second frequency, whereby the OFF state of the electric field is associated with a non-reflective state of the WGS and a lesser amount of said MQW layer optical absorption, and whereby the ON state of the electric field is associated with a reflective state of the WGS and a greater amount of said MQW layer optical absorption.

18. An optical apparatus, comprising:
   an optical source providing an incident radiation beam propagating in a non-horizontal direction;
   a horizontally disposed modulating structure receiving a modulation signal and receiving the incident radiation beam and modulating the incident radiation beam according to the modulation signal to produce a modulated radiation beam; and
   an optical receiver receiving the modulated radiation beam;
   wherein said modulating structure comprises:
      a horizontal waveguide grating structure (WGS) including a horizontal waveguiding layer along which a lateral propagation mode is guided, the lateral propagation mode having a vertically extending mode profile; and
      a multiple quantum well (MQW) layer sufficiently proximal to said horizontal waveguiding layer to be within a vertical extent of said mode profile of said lateral propagation mode; and an electric field source applying a time-varying electric field to said MQW layer according to said modulation signal.

19. The optical apparatus of claim 18, wherein said electric field source comprises:
   a first electrode layer positioned above said MQW layer;
   a second electrode layer positioned below said MQW layer; and
   a modulation voltage source coupled to said first and second electrode layers and applying a modulation voltage therebetween according to said modulation signal.

20. The optical apparatus of 19, further comprising:
   a first insulating layer positioned between said MQW layer and said first electrode layer; and
   a second insulating layer positioned between said MQW layer and said second electrode layer, said first and second insulating layers inhibiting current flow between said first and second electrode layers through said MQW layer.

* * * * *

UNITED STATES PATENT AND TRADEMARK OFFICE
CERTIFICATE OF CORRECTION

| | | |
|---|---|---|
| PATENT NO. | : 7,593,606 B2 | Page 1 of 1 |
| APPLICATION NO. | : 11/888032 | |
| DATED | : September 22, 2009 | |
| INVENTOR(S) | : David Fattal et al. | |

It is certified that error appears in the above-identified patent and that said Letters Patent is hereby corrected as shown below:

In column 8, line 35, in Claim 1, delete "field," and insert -- field --, therefor.

Signed and Sealed this

Twenty-sixth Day of October, 2010

David J. Kappos
*Director of the United States Patent and Trademark Office*